US012663700B2

(12) United States Patent
Liao et al.

(10) Patent No.: US 12,663,700 B2
(45) Date of Patent: Jun. 23, 2026

(54) LENS MODULE, PROJECTION DEVICE AND METHOD FOR ADJUSTING LENS MODULE

(71) Applicant: Coretronic Corporation, Hsin-Chu (TW)

(72) Inventors: Chia-Ching Liao, Hsin-Chu (TW); Hui-Ju Lin, Hsin-Chu (TW); Chih-Chen Chen, Hsin-Chu (TW); Tung-Yi Ko, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 334 days.

(21) Appl. No.: 18/581,305

(22) Filed: Feb. 19, 2024

(65) Prior Publication Data

US 2024/0280886 A1     Aug. 22, 2024

(30) Foreign Application Priority Data

Feb. 21, 2023    (CN) .......................... 202310141366.X

(51) Int. Cl.
    *G03B 21/14*         (2006.01)
    *G01D 5/245*         (2006.01)
(52) U.S. Cl.
    CPC .................................. *G03B 21/142* (2013.01)
(58) Field of Classification Search
    CPC ...... G03B 21/142; G03B 21/53; H04N 9/317;
                  G01D 5/2451; G01D 5/2452; G01D
                  5/347; G01D 5/3473

USPC ........................................................... 700/13
See application file for complete search history.

(56) References Cited

U.S. PATENT DOCUMENTS 5,739,775 A  *   4/1998   Brandestini ........... H03M 1/282
                                                                  341/16
2017/0285450 A1*  10/2017  Furihata ............. G03B 21/2053

FOREIGN PATENT DOCUMENTS

CN          100444022          12/2008
CN          101398598          9/2010
CN          103080805          5/2013
CN          114374829          4/2022

* cited by examiner

*Primary Examiner* — Ryan D Howard
(74) *Attorney, Agent, or Firm* — JCIPRNET

(57)                    ABSTRACT

A lens module includes a lens assembly, an actuator, an encoder, and a controller. The actuator is connected to the lens assembly. The encoder is connected to the actuator and linked with the actuator. The encoder includes a first portion and a second portion. The first portion includes multiple areas, and each of the areas includes at least one conductor. The second portion includes multiple conductive contacts. When the actuator drives the encoder to move, the second portion moves relative to the first portion, and the encoder outputs a voltage signal according to whether the conductive contacts are in contact with the at least one conductor in the areas. The controller is electrically connected to the encoder and the actuator. The controller determines a state of the encoder according to the voltage signal. A projection device and a method for adjusting the lens module are also disclosed.

20 Claims, 5 Drawing Sheets

LENS MODULE, PROJECTION DEVICE AND METHOD FOR ADJUSTING LENS MODULE

CROSS-REFERENCE TO RELATED APPLICATION

This application claims the priority benefit of China application serial no. 202310141366.X, filed on Feb. 21, 2023. The entirety of the above-mentioned patent application is hereby incorporated by reference herein and made a part of this specification.

BACKGROUND

Technical Field

The disclosure relates to a lens module, a projection device, and a method for adjusting the lens module.

Description of Related Art

In a conventional projection device, functions such as aperture control or lens focus are usually designed using a stepping motor to control a gear system, and the stepping motor is often used with a photo interrupter to detect a home position.

Most of the projection devices have a fan inside, and the fan may easily raise dust in the air during operation. A disadvantage of using the photo interrupter to detect the home position is that when the photo interrupter is affected by the dust, it will cause the photo interrupter to fail to detect accurately, causing a relative position of components of a lens to deviate, resulting in inaccurate focus and unclear projection images.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a lens module, a projection device, and a method for adjusting the lens module, which may achieve an effect of precise positioning of the lens module.

Other objectives and advantages of the disclosure may be further understood from the technical features disclosed herein.

In order to achieve one, a part, or all of the above objectives or other objectives, an embodiment of the disclosure provides a lens module, including a lens assembly, an actuator, an encoder, and a controller. The actuator is connected to the lens assembly to drive the lens assembly. The encoder is connected to the actuator and linked with the actuator. The encoder includes a first portion and a second portion. The first portion includes multiple areas, and each of the areas includes at least one conductor. The second portion includes multiple conductive contacts. When the actuator drives the encoder to move, the second portion moves relative to the first portion, and the encoder is configured to output a voltage signal according to whether the conductive contacts are in contact with the at least one conductor in the areas. The controller is electrically connected to the encoder and the actuator. The controller is configured to determine a state of the encoder according to the voltage signal. The state includes a first state and a second state, and the controller is configured to control the actuator to move toward a first direction to a home position in response to the state of the encoder being the first state. The home position is a position of the actuator when the encoder transitions from the first state to the second state, and the controller is configured to control the actuator to move toward a second direction different from the first direction until the encoder is in the first state in response to the state of the encoder not being the first state, and then control the actuator to move toward the first direction to the home position.

An embodiment of the disclosure provides a projection device, including an illumination system, a light valve, and the lens module. The illumination system is configured to provide an illumination beam. The light valve is disposed on a transmission path of the illumination beam and configured to convert the illumination beam into an image beam. The lens module is disposed on a transmission path of the image beam and configured to project the image beam out of the projection device.

An embodiment of the disclosure provides a method for adjusting a lens module includes the following. A lens assembly is driven by an actuator. An encoder is linked by the actuator. The encoder includes a first portion and a second portion. The first portion includes multiple areas, and each of the areas includes at least one conductor. The second portion includes multiple conductive contacts. When the actuator drives the encoder to move, the second portion moves relative to the first portion. A voltage signal is output to a controller by the encoder according to whether the conductive contacts are in contact with the at least one conductor in the areas. A state of the encoder is determined by the controller according to the voltage signal. The state includes a first state and a second state. When the state of the encoder is the first state, the controller controls the actuator to move toward a first direction to a home position. The home position is a position of the actuator when the encoder transitions from the first state to the second state. When the state of the encoder is not the first state, the controller controls the actuator to move toward a second direction different from the first direction until the state of the encoder is the first state, and then controls the actuator to move toward the first direction to the home position.

Based on the above, the embodiments of the disclosure have at least one of the following advantages or effects. In the lens module, the projection device, and the method for adjusting the lens module in the embodiments of the disclosure, when the first portion and the second portion of the encoder move relative to each other by linking the encoder with the actuator, the encoder is configured to output the voltage signal according to whether the conductive contacts are in contact with the at least one conductor in the areas. Through the voltage signal, the controller may determine the state of the encoder, and then control the actuator to move to the home position, so as to achieve the effect of precise positioning of the lens module. Since a photo interrupter is not used in the lens module, the projection device, and the method for adjusting the lens module to find the home position in the embodiments of the disclosure, the malfunctions caused by the dust covering the photo interrupter may be effectively avoided.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
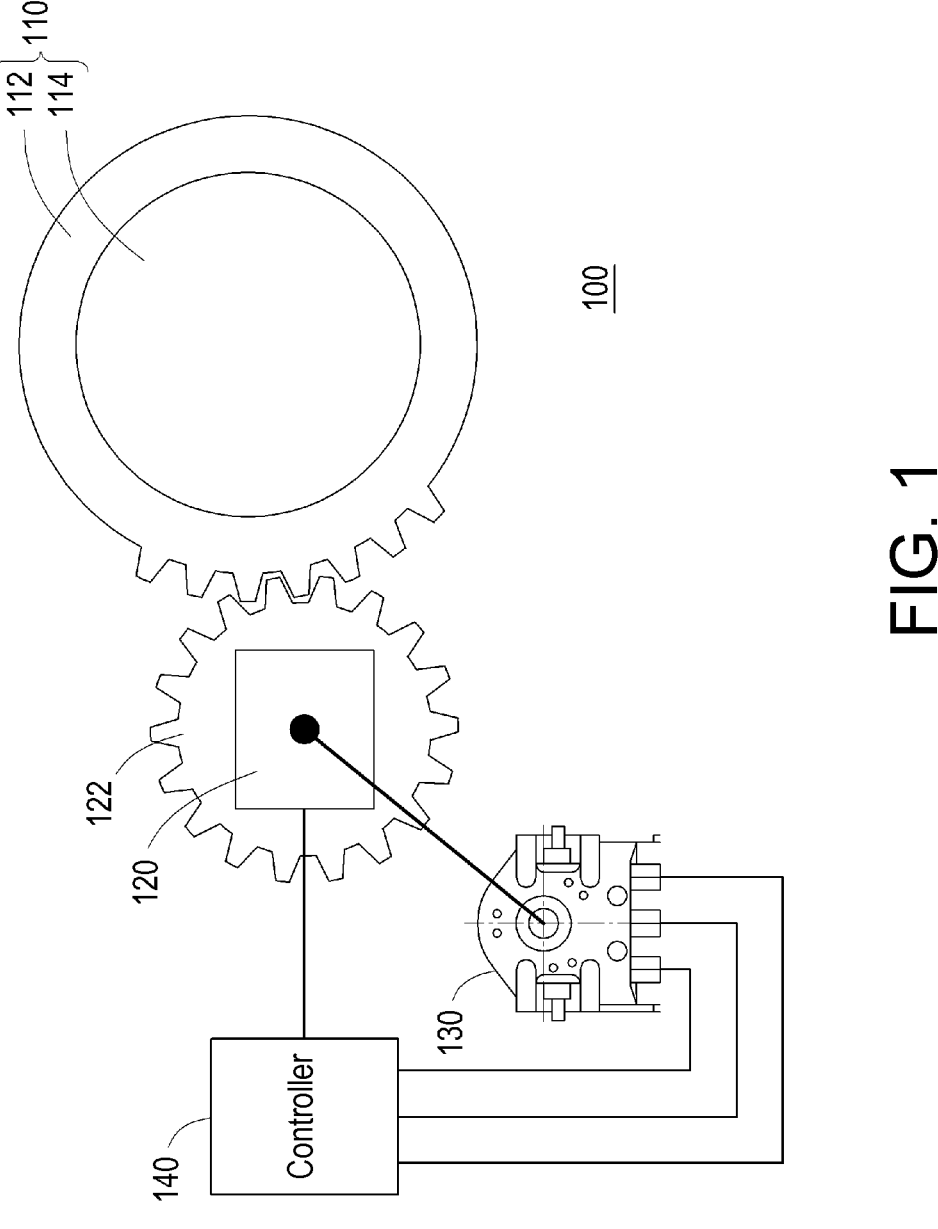
FIG. 1 is a schematic view of a lens module according to an embodiment of the disclosure.
Figure 2B:
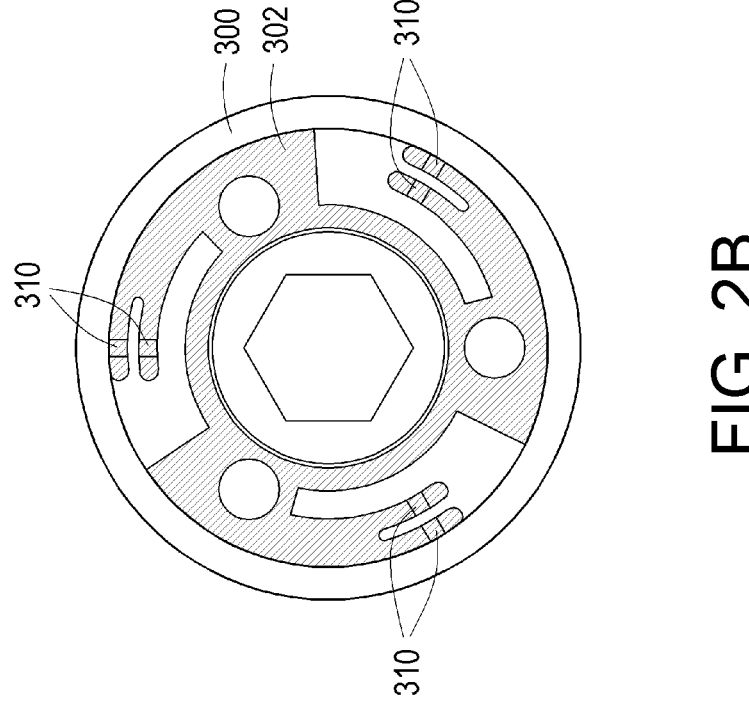
FIG. 2B is a schematic view of a second portion of the encoder in FIG. 1.
Figure 2A:
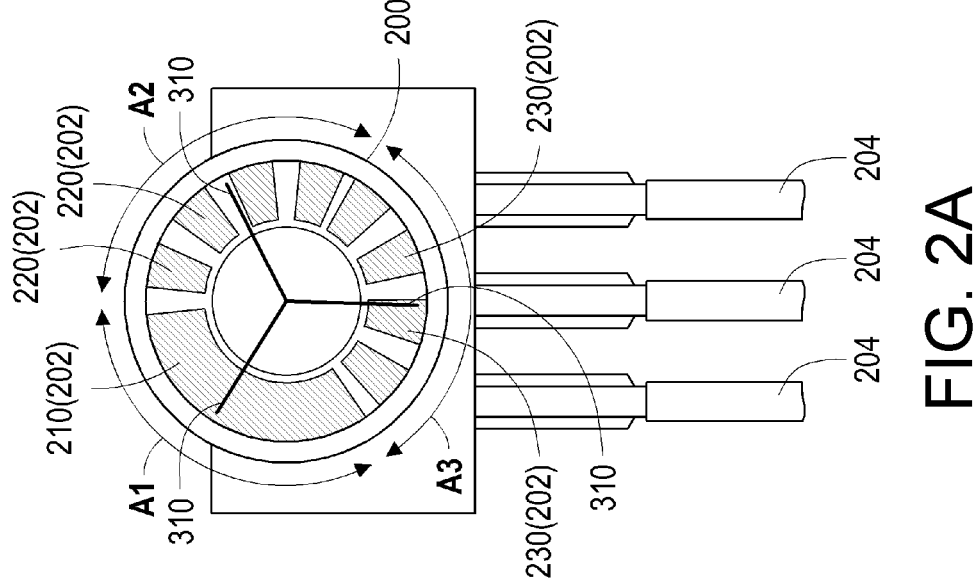
FIG. 2A is a schematic view of a first portion of an encoder in FIG. 1 and a relationship thereof with a conductive contact.

FIG. 1 is a schematic view of a lens module according to an embodiment of the disclosure. FIG. 2A is a schematic view of a first portion of an encoder in FIG. 1 and a relationship thereof with a conductive contact. FIG. 2B is a schematic view of a second portion of the encoder in FIG. 1. Referring to FIGS. 1, 2A, and 2B, a lens module 100 in this embodiment includes a lens assembly 110, an actuator 120, an encoder 130, and a controller 140. The lens assembly 110 includes a lens barrel 112 and a lens set 114 disposed in the lens barrel 112. The lens set 114 may include at least one lens. The lens set 114 includes, for example, a combination of one or more optical lenses with diopters, such as various combinations of non-planar lenses such as biconcave lenses, biconvex lenses, concave-convex lenses, convex-concave lenses, plano-convex lenses, and plano-concave lenses. In an embodiment, the lens set 114 may also include a flat optical lens. Herein, a form and type of the lens set 114 is not limited in this embodiment. The actuator 120 is connected to the lens assembly 110, the actuator 120 is configured to drive the lens assembly 110. In this embodiment, the actuator 120 is, for example, a motor, which is configured to drive a gear 122 to rotate, thereby driving the lens assembly 110. For example, the actuator 120 may push the lens barrel 112 of the lens assembly 110 to zoom or focus the lens assembly 110. The actuator 120 may adjust an aperture stop of the lens assembly 110 to change an aperture value of the lens assembly 110.

The encoder 130 is connected to the actuator 120, and is linked with the actuator 120. The encoder 130 and the actuator 120 move in the same direction. The encoder 130 includes a first portion 200 and a second portion 300. The first portion 200 includes multiple areas. In this embodiment, as shown in FIG. 2A, the areas may include a first area A1, a second area A2, and a third area A3, and each of the areas includes at least one conductor 202. The second portion 300 includes multiple conductive contacts 310. An actual shape of the conductive contact 310 is shown in FIG. 2B, which is a bump (protrude) of a conductive sheet 302. The conductive sheet 302 is, for example, a metal conductive sheet. For example, in this embodiment, the three conductive contacts 310 are separated by a central angle of 120 degrees, and the three conductive contacts correspond to the first area A1, the second area A2, and the third area A3 respectively. In order to facilitate a relative positional relationship between the conductive contact 310 and the conductor 202, the conductive contact 310 is shown with ends of three radial line segments in FIG. 2A, and the first portion 200 in FIG. 2A and the second portion 300 in FIG. 2B are disposed adjacently in a face-to-face direction.

When the actuator 120 drives the encoder 130 to move, the second portion 300 moves relative to the first portion 200. In this embodiment, the second portion 300 is adapted to rotate relative to the first portion 200, and the first portion 200 is annular. In this embodiment, one of the first portion 200 and the second portion 300 is a fixed member (fixed plate, fixed piece or fixer), and the other one of the first portion 200 and the second portion 300 is a rotating member (wheel). For example, the first portion 200 is the fixed member, and the second portion 300 is the rotating member.

The encoder 130 is configured to output a voltage signal according to whether the conductive contacts 310 are in contact with the at least one conductor 202 in the areas (e.g., the first area A1, the second area A2, and the third area A3).

In this embodiment, the conductor 202 included in the first area A1 is embodied as a first conductive sheet 210. The conductor 202 included in the second area A2 is embodied as multiple second conductive sheets 220 arranged at intervals. The conductor 202 included in the third area A3 is embodied as multiple third conductive sheets 230 arranged at intervals. The first conductive sheet 210, the second conductive sheet 220, and the third conductive sheet 230 may be copper sheets, for example.

The controller 140 is electrically connected to the encoder 130 and the actuator 120. The controller 140 is configured to determine a state of the encoder 130 according to the voltage signal. The state includes a first state and a second state.

Figures 3A, 3B, 3C, 3D:
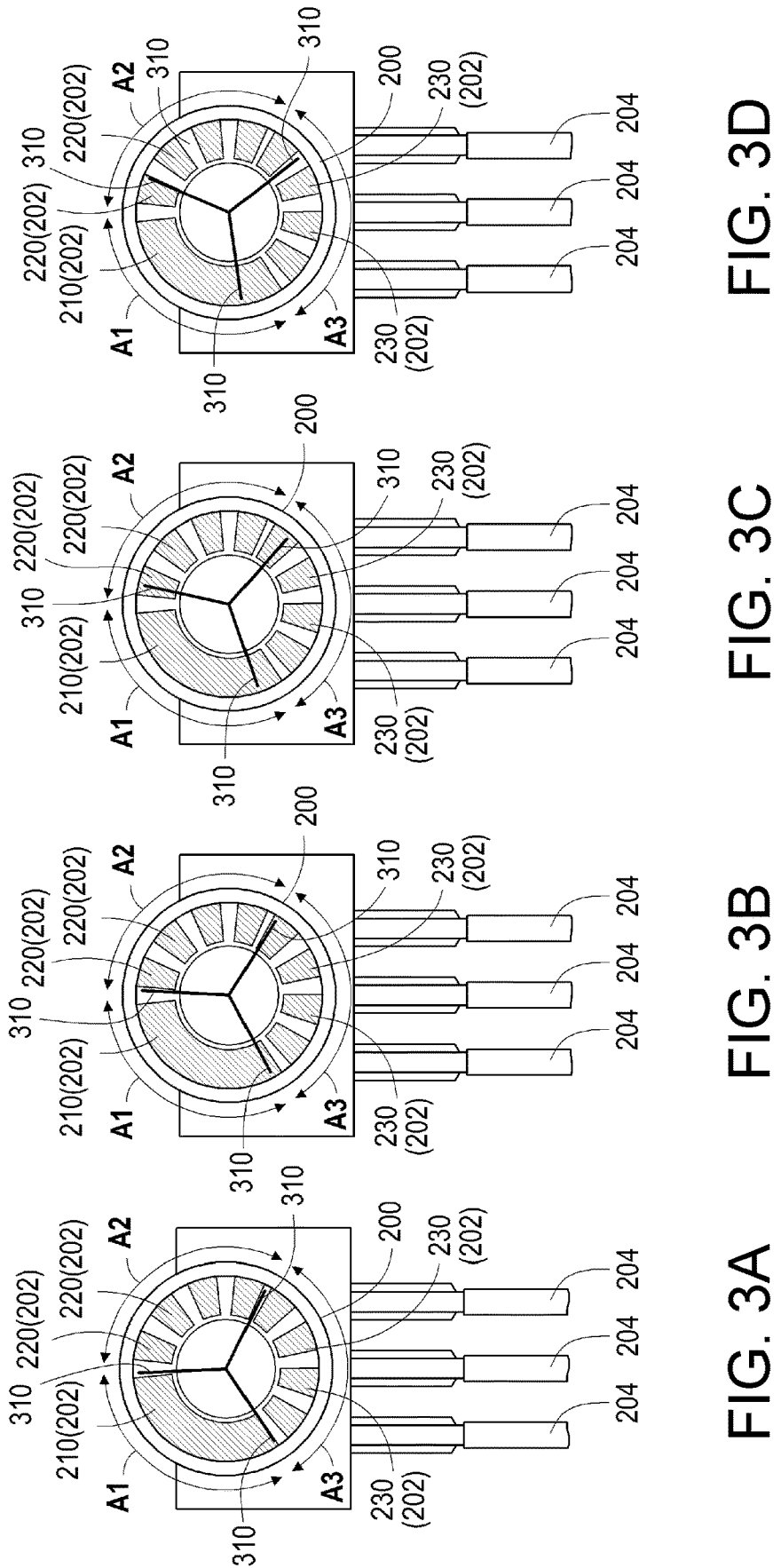
FIGS. 3A, 3B, 3C, and 3D are schematic views of a relationship between the first portion and the conductive contact when the encoder in FIG. 1 is in a first state, a second state, a third state, and a fourth state respectively.

FIGS. 3A and 3B are schematic views of a relationship between the first portion and the conductive contact when the encoder in FIG. 1 is in the first state and the second state respectively. In this embodiment, the first state is that one of the conductive contacts 310 is in contact with the first conductive sheet 210, and the conductive contacts 310 are not in contact with the second conductive sheets 220 and the third conductive sheets 230, as shown in the FIG. 3A. The second state is that two of the conductive contacts 310 are in contact with the first conductive sheet 210 and one of the third conductive sheets 230 respectively, and the conductive contacts 310 are not in contact with the second conductive sheets 220, as shown in FIG. 3B.

In this embodiment, the states may further include a third state and a fourth state. FIGS. 3C and 3D are schematic views of a relationship between the first portion and the conductive contact when the encoder in FIG. 1 is in the third state and a fourth state respectively. When the encoder 130 moves toward a first direction, the third state is that the conductive contacts 310 are in contact with the first conductive sheet 210, one of the second conductive sheets 220, and one of the third conductive sheets 230 respectively. The fourth state is that two of the conductive contacts 310 are in contact with one of the second conductive sheets 220 and the first conductive sheet 210 respectively, and the conductive contacts 310 are not in contact with the third conductive sheets 230.

Changes in the state (voltage signal) of the encoder 130 are shown in Table 1 below.

TABLE 1

| | When the encoder 130 moves, the conductive sheet in contact with the conductive contact 310 | |
| --- | --- | --- |
| State | moves toward the first direction | moves toward a second direction |
| First state | the first conductive sheet | the first conductive sheet |
| Second state | the first conductive sheet, the third conductive sheets | the first conductive sheet, the third conductive sheets |
| Third state | the first conductive sheet, the second conductive sheets, the third conductive sheets | the first conductive sheet, the second conductive sheets |
| Fourth state | the first conductive sheet, the second conductive sheets | the first conductive sheet, the second conductive sheets, the third conductive sheets |

The controller 140 obtains a rotation direction and displacement of the lens assembly 110 through the changes in the state (voltage signal) of the encoder 130. The controller 140 is configured to control the actuator 120 to move toward the first direction to a home position in response to the state of the encoder 130 being the first state. The home position is a position of the actuator 120 when the state of the encoder 130 transitions from the first state to the second state. That is, the home position is the position of the actuator 120 when the encoder 130 is in a state shown in FIG. 3B. The controller 140 is configured to control the actuator 120 to move toward the second direction different from the first direction until the state of the encoder 130 is the first state in response to the state of the encoder 130 not being the first state, and then control the actuator 120 to move toward the first direction to the home position. In this embodiment, the first direction and the second direction are opposite directions. One of the first direction and the second direction is a clockwise direction, and the other one of the first direction and the second direction is a counterclockwise direction. For example, taking FIGS. 3A to 3D as an example, when the actuator 120 moves toward the first direction (the clockwise direction), the conductive contacts 310 rotate in the clockwise direction, and when the actuator 120 moves toward the second direction (the counterclockwise direction), the conductive contacts 310 rotate in the counterclockwise direction. In this embodiment, the encoder 130 may convert the displacement of the conductive contact 310 into a periodic voltage signal (encoder pulses). From the home position of the actuator 120, the state of the encoder 130 is sequentially the second state, the third state, the fourth state, the second state, the third state, the fourth state . . . , and so on, and until after a cycle, the state of the encoder 130 returns to the first state.

In the lens module 100 in this embodiment, when the first portion 200 and the second portion 300 of the encoder 130 move (for example, rotate) relative to each other through the linkage between the encoder 130 and the actuator 120, the encoder 130 is configured to output the voltage signal according to whether the conductive contacts 310 are in contact with the at least one conductor 202 in the areas. Through the voltage signal, the controller 140 may determine the state of the encoder 130, and then obtain the rotation direction and the displacement of the lens assembly 110 driven by the actuator 120, and may control the actuator 120 to move to the home position.

In this embodiment, the encoder 130 further includes three pins 204 electrically connected to the first conductive sheet 210, the second conductive sheet 220, and the third conductive sheet 230 respectively. The three pins 204 are electrically connected to the controller 140, and the three pins 204 are configured to respectively output the voltage signals indicating whether the first conductive sheet 210, the second conductive sheet 220, and the third conductive sheet 230 are in contact with the conductive contact 310. A combination of the voltage signals output by the three pins 204 may represent which state of the encoder 130 is from the first state to the fourth state.

In an embodiment, the controller 140 is, for example, a central processing unit (CPU), a microprocessor, a digital signal processor (DSP), a programmable controller, a programmable logic device. (PLD), other similar devices, or a combination of the above devices, but the disclosure is not limited thereto. The number of controller(s) 140 may be one or multiple. In an embodiment, each of functions of the controller 140 may be implemented as multiple program codes. The program codes are stored in a memory, and the controller 140 executes the program codes. In an embodiment, each of the functions of the controller 140 may be implemented as one or more circuits. The disclosure does not limit the implementation of the functions of the controller 140 by means of software or hardware.

Figure 4:
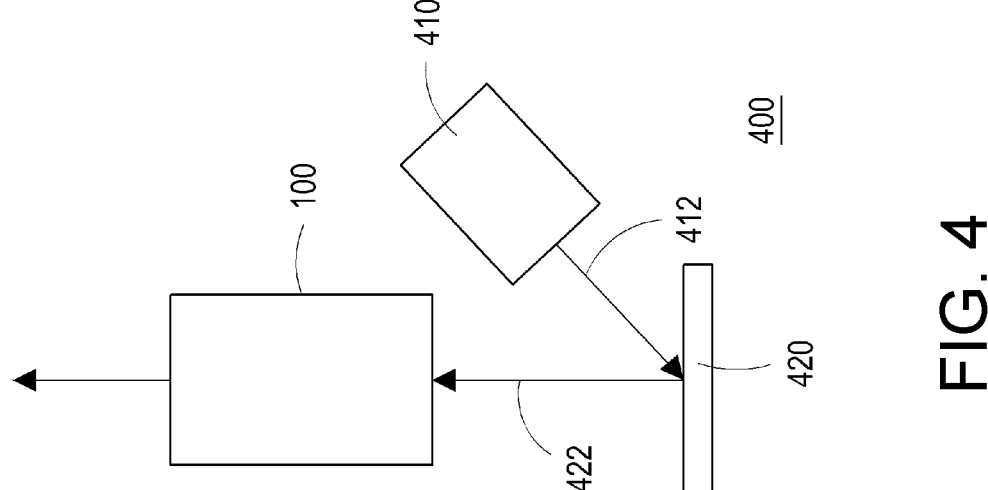
FIG. 4 is a schematic view of a structure of a projection device using the lens module in FIG. 1.

FIG. 4 is a schematic view of a structure of a projection device using the lens module in FIG. 1. Referring to FIGS. 1 and 4, a projection device 400 in this embodiment includes an illumination system 410, a light valve 420, and the lens module 100. The illumination system 410 is configured to provide an illumination beam 412. The light valve 420 is disposed on a transmission path of the illumination beam 412 and configured to convert the illumination beam 412 into an image beam 422. In this embodiment, the light valve 420 is, for example, a digital micro-mirror device (DMD) or a liquid-crystal-on-silicon panel (LCOS panel). In other embodiments, the light valve 420 may also be a transmissive liquid crystal panel or other suitable spatial light modulators (SLMs). The lens module 100 is disposed on a transmission path of the image beam 422, and is configured to project the image beam 422 out of the projection device 400, such as projecting on a screen to form an image frame.

When the projection device 400 is turned on, the controller 140 may find the home position of the actuator 120 through the above method, so as to ensure that a focusing system or an aperture system may move to a home setting position, and may effectively avoid malfunctions caused by dust shielding and is not affected by the dust that may be raised by a fan inside the projection device 400.

Figure 5:
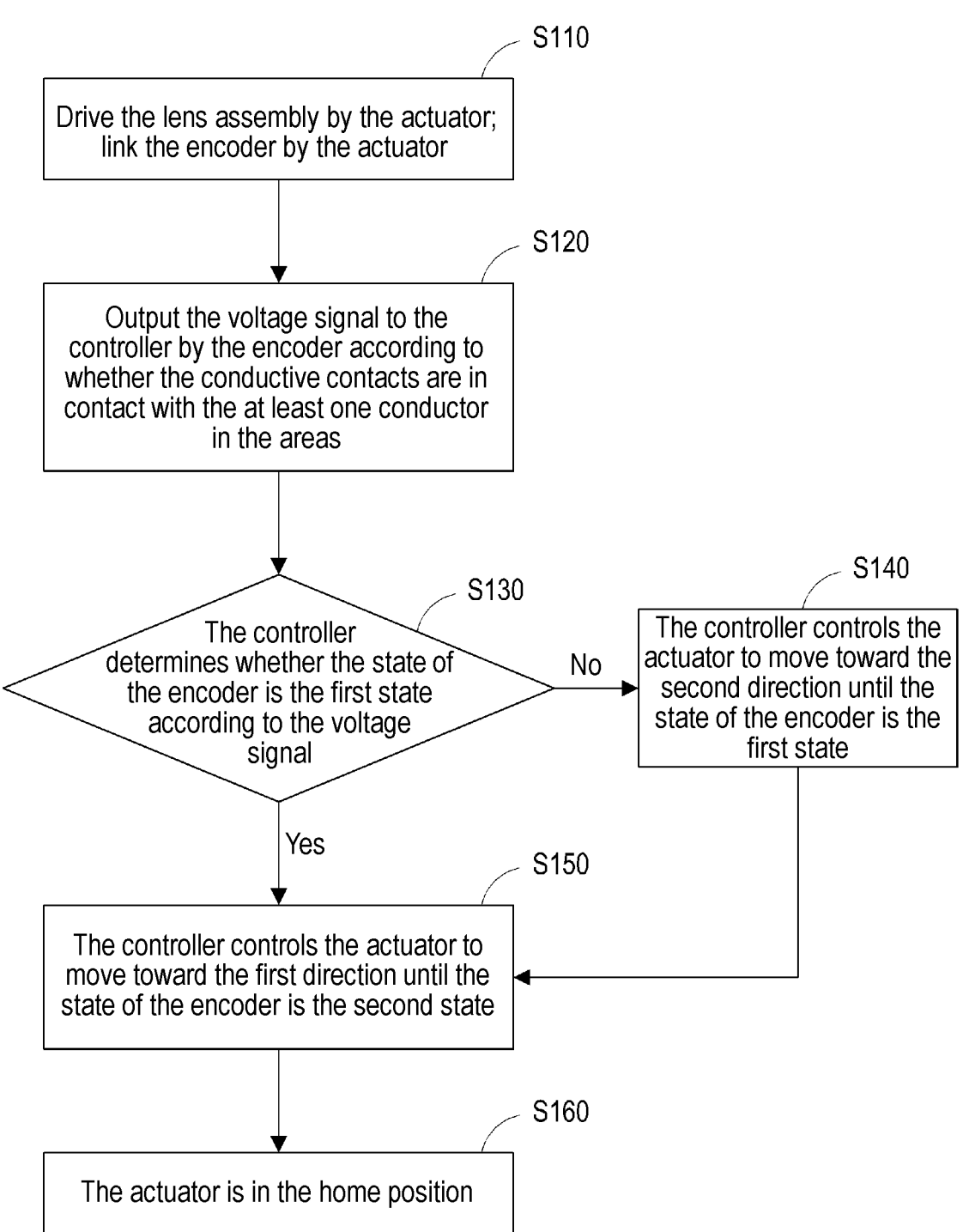
FIG. 5 is a flowchart of a method for adjusting a lens module according to an embodiment of the disclosure.

FIG. 5 is a flowchart of a method for adjusting a lens module according to an embodiment of the disclosure. Referring to FIGS. 1, 2A, 2B, and 3A to 3D, the method for adjusting the lens module in this embodiment may be implemented by using the above lens module 100. The method for adjusting the lens module in this embodiment includes the following steps. First, in step S110, the lens assembly 110 is driven by the actuator 120, and the encoder 130 is linked by the actuator 120. Then, in step S120, the voltage signal is output to the controller 140 by the encoder 130 according to whether the conductive contacts 310 are in contact with the at least one conductor 202 in the areas (e.g., the first area A1, the second area A2, and the third area A3). Next, in step S130, the state of the encoder 130 is determined by the controller 140 according to the voltage signal, such as determining whether the state of the encoder 130 is the first state. If the state of the encoder 130 is the first state, step S150 is continued to be executed, and if the state of the encoder 130 is not the first state, step S140 is continued to be executed. In step S150, the controller 140 controls the actuator 120 to move toward the first direction until the state of the encoder 130 is the second state. In step S160, the actuator 120 is in the home position. That is, the controller 140 controls the actuator 120 to move toward the first direction to the home position. The home position is the position of the actuator 120 when the state of the encoder 130 transitions from the first state to the second state. In step S140, the controller 140 controls the actuator 120 to move toward the second direction until the state of the encoder 130 is the first state, and then steps S150 and S160 are continued to be executed, that is, controls the actuator 120 to move toward the first direction to the home position. Other details of the controller 140, the encoder 130, the actuator 120, and the lens assembly 110 and actuation details thereof are described in detail in the above embodiments. Therefore, the same details will not be repeated in the following.

Based on the above, the embodiments of the disclosure have at least one of the following advantages or effects. In the lens module, the projection device, and the method for adjusting the lens module in the embodiments of the disclosure, when the first portion and the second portion of the encoder move relative to each other by linking the encoder with the actuator, the encoder is configured to output the voltage signal according to whether the conductive contacts are in contact with the at least one conductor in the areas. Through the voltage signal, the controller may determine the state of the encoder, and then control the actuator to move to the home position, so as to achieve the effect of precise positioning of the lens module. Since a photo interrupter is not used in the lens module, the projection device, and the method for adjusting the lens module to find the home position in the embodiments of the disclosure, the malfunctions caused by the dust covering the photo interrupter may be effectively avoided.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lens module, comprising:

a lens assembly;

an actuator connected to the lens assembly, the actuator is configured to drive the lens assembly;

an encoder connected to the actuator and linked with the actuator, wherein the encoder comprises:

a first portion comprising a plurality of areas, wherein each of the areas comprises at least one conductor; and a second portion comprising a plurality of conductive contacts, wherein when the actuator drives the encoder to move, the second portion moves relative to the first portion, and the encoder is configured to output a voltage signal according to whether the conductive contacts are in contact with the at least one conductor in the areas; and a controller electrically connected to the encoder and the actuator, wherein the controller is configured to determine a state of the encoder according to the voltage signal, the state comprises a first state and a second state, and the controller is configured to control the actuator to move toward a first direction to a home position in response to the state of the encoder being the first state, wherein the home position is a position of the actuator when the state of the encoder transitions from the first state to the second state, and the controller is configured to control the actuator to move toward a second direction different from the first direction until the state of the encoder is the first state in response to the state of the encoder not being the first state, and then control the actuator to move toward the first direction to the home position.

2. The lens module according to claim 1, wherein the areas comprise:

a first area, wherein the at least one conductor comprised in the first area is a first conductive sheet;

a second area, wherein the at least one conductor comprised in the second area is a plurality of second conductive sheets arranged at intervals; and a third area, wherein the at least one conductor comprised in the third area is a plurality of third conductive sheets arranged at intervals.

3. The lens module according to claim 2, wherein the first state is that one of the conductive contacts is in contact with the first conductive sheet, and the conductive contacts are not in contact with the second conductive sheets and the third conductive sheets, the second state is that two of the conductive contacts are in contact with the first conductive sheet and one of the third conductive sheets respectively, and the conductive contacts are not in contact with the second conductive sheets.

4. The lens module according to claim 1, wherein the second portion is adapted to rotate relative to the first portion, and the first portion is annular.

5. The lens module according to claim 1, wherein one of the first portion and the second portion is a fixed member, and the other one of the first portion and the second portion is a rotating member.

6. The lens module according to claim 1, wherein one of the first direction and the second direction is a clockwise direction, and the other one of the first direction and the second direction is a counterclockwise direction.

7. The lens module according to claim 1, wherein the actuator is configured to push a lens barrel of the lens assembly to zoom or focus the lens assembly.

8. The lens module according to claim 1, wherein the actuator is configured to adjust an aperture stop of the lens assembly to change an aperture value of the lens assembly.

9. A projection device, comprising:

an illumination system configured to provide an illumination beam;

a light valve disposed on a transmission path of the illumination beam and configured to convert the illumination beam into an image beam; and a lens module disposed on a transmission path of the image beam and configured to project the image beam out of the projection device, wherein the lens module comprises:

a lens assembly;

an actuator connected to the lens assembly, the actuator is configured to drive the lens assembly;

an encoder connected to the actuator and linked with the actuator, wherein the encoder comprises:

a first portion comprising a plurality of areas, wherein each of the areas comprises at least one conductor; and a second portion comprising a plurality of conductive contacts, wherein when the actuator drives the encoder to move, the second portion moves relative to the first portion, and the encoder is configured to output a voltage signal according to whether the conductive contacts are in contact with the at least one conductor in the areas; and a controller electrically connected to the encoder and the actuator, wherein the controller is configured to determine a state of the encoder according to the voltage signal, the state comprises a first state and a second state, and the controller is configured to control the actuator to move toward a first direction to a home position in response to the state of the encoder being the first state, wherein the home position is a position of the actuator when the state of the encoder transitions from the first state to the second state, and the controller is configured to control the actuator to move toward a second direction different from the first direction until m the encoder is the first state in response to the state of the encoder not being the first state, and then control the actuator to move toward the first direction to the home position.

10. The projection device according to claim 9, wherein the areas comprise:

a first area, wherein the at least one conductor comprised in the first area is a first conductive sheet;

a second area, wherein the at least one conductor comprised in the second area is a plurality of second conductive sheets arranged at intervals; and a third area, wherein the at least one conductor comprised in the third area is a plurality of third conductive sheets arranged at intervals.

11. The projection device according to claim 10, wherein the first state is that one of the conductive contacts is in contact with the first conductive sheet, and the conductive contacts are not in contact with the second conductive sheets and the third conductive sheets, the second state is that two of the conductive contacts are in contact with the first conductive sheet and one of the third conductive sheets respectively, and the conductive contacts are not in contact with the second conductive sheets.

12. The projection device according to claim 9, wherein the second portion is adapted to rotate relative to the first portion, and the first portion is annular.

13. The projection device according to claim 9, wherein one of the first portion and the second portion is a fixed member, and the other one of the first portion and the second portion is a rotating member.

14. The projection device according to claim 9, wherein one of the first direction and the second direction is a clockwise direction, and the other one of the first direction and the second direction is a counterclockwise direction.

15. The projection device according to claim 9, wherein the actuator is configured to push a lens barrel of the lens assembly to zoom or focus the lens assembly.

16. The projection device according to claim 9, wherein the actuator is configured to adjust an aperture stop of the lens assembly to change an aperture value of the lens assembly.

17. A method for adjusting a lens module, comprising:

driving a lens assembly by an actuator;

linking an encoder by the actuator, wherein the encoder comprises:

a first portion comprising a plurality of areas, wherein each of the areas comprises at least one conductor; and a second portion comprising a plurality of conductive contacts, wherein when the actuator drives the encoder to move, the second portion moves relative to the first portion;

outputting a voltage signal to a controller by the encoder according to whether the conductive contacts are in contact with the at least one conductor in the areas;

determining a state of the encoder by the controller according to the voltage signal, wherein the state comprises a first state and a second state;

when the state of the encoder is the first state, controlling the actuator to move toward a first direction to a home position by the controller, wherein the home position is a position of the actuator when the state of the encoder transitions from the first state to the second state; and when the state of the encoder is not the first state, controlling the actuator to move toward a second direction until the state of the encoder is the first state, and then controlling the actuator to move toward the first direction to the home position by the controller.

18. The method for adjusting the lens module according to claim 17, wherein the areas comprise:

a first area, wherein the at least one conductor comprised in the first area is a first conductive sheet;

a second area, wherein the at least one conductor comprised in the second area is a plurality of second conductive sheets arranged at intervals; and a third area, wherein the at least one conductor comprised in the third area is a plurality of third conductive sheets arranged at intervals.

19. The method for adjusting the lens module according to claim 18, wherein the first state is that one of the conductive contacts is in contact with the first conductive sheet, and the conductive contacts are not in contact with the second conductive sheets and the third conductive sheets, the second state is that two of the conductive contacts are in contact with the first conductive sheet and one of the third conductive sheets respectively, and the conductive contacts are not in contact with the second conductive sheets.

20. The method for adjusting the lens module according to claim 17, wherein the second portion is adapted to rotate relative to the first portion, and the first portion is annular.

* * * * *